United States Patent [19]

Hendershot

[11] Patent Number: 5,041,060

[45] Date of Patent: Aug. 20, 1991

[54] FLEXIBLE COUPLING

[75] Inventor: Robert V. Hendershot, Evanston, Ill.

[73] Assignee: Candy Mfg. Co., Inc., Evanston, Ill.

[21] Appl. No.: 568,418

[22] Filed: Aug. 16, 1990

[51] Int. Cl.$^5$ ............................ F16D 3/16; F16D 3/56; F16D 3/79

[52] U.S. Cl. ............................ 464/86; 464/99; 464/100; 464/147

[58] Field of Search ............... 464/78, 81, 84, 85, 464/86, 87, 92, 98, 99, 100, 101, 106, 147, 162

[56] References Cited

U.S. PATENT DOCUMENTS

| | | | |
|---|---|---|---|
| 3,071,942 | 1/1963 | Alcaro | 464/78 |
| 3,124,342 | 3/1964 | Ormond | 464/86 X |
| 3,150,506 | 9/1964 | Alcaro | 464/78 |
| 3,611,750 | 10/1971 | Gasior | 464/84 |
| 3,844,137 | 10/1974 | Zugel | 464/78 |
| 4,214,458 | 7/1980 | Philleo | 464/85 |
| 4,671,780 | 6/1987 | Weir | 464/85 |
| 4,858,897 | 8/1989 | Irifune | 464/78 X |

FOREIGN PATENT DOCUMENTS

| | | | |
|---|---|---|---|
| 43702 | 2/1937 | France | 464/78 |
| 45503 | 3/1955 | Netherlands | 464/78 |
| 47602 | 2/1976 | U.S.S.R. | 464/78 |
| 47903 | 3/1979 | U.S.S.R. | 464/86 |

Primary Examiner—Daniel P. Stodola
Assistant Examiner—Tony A. Gayoso
Attorney, Agent, or Firm—McCaleb, Lucas & Brugman

[57] ABSTRACT

A one piece, mechanical, flexible coupling for interconnecting driving and driven shafts, which is capable of accommodating separate or combined angular, skewed or parallel shaft misalignments and axial shaft movements while permitting limited torsional or radial deflection thereof. The coupling is fashioned from a single piece of metal or other rigid material and includes a plurality of parallel, axially spaced, annular discs lying normal to the coupling's longitudinal axis and integrally interjoined with one another and with two shaft connector hubs by intervening spacers. The discs and hubs operate as flexible, zero back lash coupling portions at opposite ends of an integrally intervening midsection which operatively permits limited radial or torsional shaft deflection and is made up of a selected number of elongated flexible vane elements lying parallel to and radially displaced from the central longitudinal axis of the coupling.

4 Claims, 1 Drawing Sheet

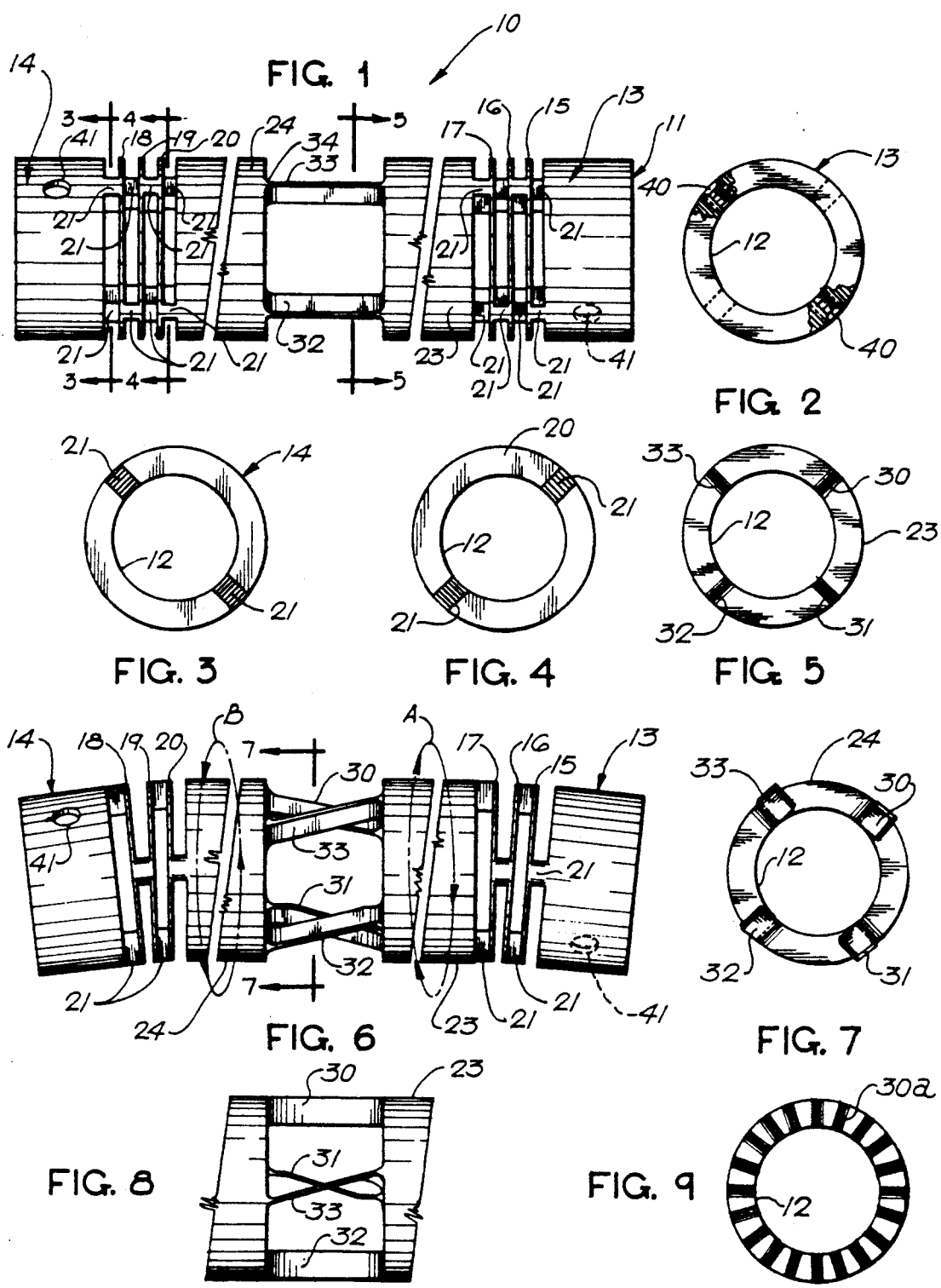

5,041,060

FLEXIBLE COUPLING

This invention concerns the art of flexible couplings, particularly for transmitting torque between driving and driven shafts while permitting separate or combined, angular skewed or parallel shaft misalignments and limited torsional deflections.

BACKGROUND OF THE INVENTION

Flexible couplings of various structures are known in the art. Of particular interest to the present invention are the couplings set forth in U.S. Pat. Nos. 3,071,942 to Alcaro, issued Jan. 8, 1963; 3,150,506 to Alcaro, issued Sept. 29, 1964; and 3,844,137 to Zugel, issued Oct. 29, 1974. The couplings demonstrated in these patents generally incorporate a unitary cylindrical body having hub portions at its opposite ends and a lengthwise extending bore. Plural axially spaced slots, cut normal to the body's longitudinal axis are formed in the body between the hub portions. The slots form integrally interjoined leaf springs of limited flexibility therebetween which permit axial and radial misalignment of shafts connected to the hub portions.

SUMMARY OF THE INVENTION

The flexible coupling of this invention improves over prior known couplings of a similar nature by providing a coupling made up of a length of generally cylindrical metal, rigid synthetic or reinforced plastic material which has an axial bore and shaft connective hubs at its opposite ends. Adjacent each of the hubs and integral therewith is a selected plurality of integrally interjoined annular discs which provide zero backlash shaft operation, but permit angular, skewed and parallel shaft misalignment and axial movement of shafts connected to the hubs. A midsection of the coupling comprises a selected plurality of longitudinally extending vane elements of generally uniform thickness disposed radially outwardly of the longitudinal axis of the coupling to provide for limited torsional or radial deflection between shafts to accommodate operational vibration and start up and stopping torque loads.

It is a principle object of this invention to provide an improved one-piece flexible coupling operable between driving and driven shafts, that normally operates as a zero backlash coupling, but has provision for permitting limited axial movement and torsional deflection as well as angular, skewed and parallel shaft misalignment.

It is another important object of this invention to provide a one-piece, zero backlash flexible coupling having controlled limited torsional deflective characteristics and which is of low cost, long life construction capable of operating virtually wear free without lubrication.

Having thus described the invention, the above and other objects, features and advantages thereof will be apparent from the following detailed description of a preferred embodiment thereof, illustrated in the accompanying drawings and more particularly defined in the appended claims, as representing the best mode presently contemplated for enabling those of skill in the art to practice this invention.

IN THE DRAWINGS

FIG. 1 is a foreshortened side elevational view of a flexible coupling of this invention;

FIG. 2 is a right hand end elevation thereof with portions broken away in section;

FIG. 3 is a cross section taken substantially along vantage line 3—3 of FIG. 1 and looking in the direction of the arrows thereon;

FIG. 4 is another cross section, similar to FIG. 3, taken substantially along vantage line 4—4 of FIG. 1 and looking in the direction of the arrows thereon;

FIG. 5 is a cross section taken substantially along vantage line 5—5 of FIG. 1 and looking in the direction of the arrows thereon;

FIG. 6 is a side elevation of the coupling seen in FIG. 1, showing its axial, angular and torsional deflection characteristics in particular;

FIG. 7 is a cross section taken substantially along vantage line 7—7 of FIG. 6, looking in the direction of the arrows thereon;

FIG. 8 is a partial side elevation of the mid section of the coupling rotated 90° as seen in FIGS. 6 and 7 to illustrate the vane deflection under torsional load; and FIG. 9 is a cross sectional view, similar to FIG. 5, which illustrates a modified mid section structure having an increased number of torsional vanes.

DESCRIPTION OF THE PREFERRED EMBODIMENT

As shown in FIG. 1 a flexible coupling, indicated generally at 10, comprises a cylindrical body 11 having a central bore 12 (see FIG. 2), a right hand cylindrical shaft connective hub 13 and a corresponding left hand shaft connective hub 14 disposed at the opposite ends of the body. The right hand connective hub 13 is formed integrally adjacent with a selected plurality of (three) annular flexible disc elements 15, 16 and 17 in the illustrated embodiment. In similar fashion, the left hand connective hub 14 is formed integrally with and axially adjacent to three additional flexible annular disc elements 18, 19 and 20.

As best shown in FIGS. 1 and 6 of the drawings, disc elements 15–20 are formed of a desired thickness and number, depending on the torque loads to be transmitted by the coupling and the material of the body 11, which may comprise ferrous and aluminum alloys, bronze, stainless steel and other suitable metals and alloys as well as rigid synthetic or reinforced plastic materials having requisite strength and flexibility. Such discs are formed, as shown in FIG. 1, in parallel spaced relationship normal to the axis of body 11 as by sawing, milling or similar removal operations to form co-planar slots in opposite sides of the body thereby removing material between discs to formulate integral uncut portions of the body which constitute diametrically opposed spacers 21 between adjacent discs as well as between the end discs 15 and 18 and their respective hubs 13 and 14. Preferably, as will be understood from FIGS. 3, 4 and 6, the pairs of spacers 21 associated with one side of a disc, are aligned at 90° intervals from the spacers 21 on the opposite side of such disc. This relationship holds true throughout the two symmetrical disc arrays which may constitute any desired number of discs and spacers of selected thickness depending on the flexibility characteristics to be achieved and performed by the coupling assembly 10; the discs flexing about the spacers as shown in FIG. 6.

It will be noted that the axially innermost discs of the two arrays thereof, such as 17 and 18 in the illustrated embodiment, are suitably joined by spacers 21 to intermediate cylindrical body portions 23 and 24, respectively. Since the connective hubs 13 and 14 are respectively joined to the intermediate body portions 23 and 24 by the intervening discs 15–20 and spacers 21, it will be understood that the end hubs and their intermediate body portions 23 and 24 are respectively joined integrally with one another via two zero backlash connector systems which, however, are sufficiently flexible to permit regulated angular, skewed or parallel misalignment between the hub members 13 and 14 and the shafts secured thereto.

In addition, due to the flexible nature of the multiple disc elements, each array thereof also is capable of permitting limited axial extension and contraction of the arrays of spacer elements whereby to permit corresponding axial movements of shaft members (not shown) fixed to the hub members 13 and 14 in operation. Such movements of the disc element arrays are illustrated in FIG. 6 of the drawings along with the capability of such arrays to permit angular misalignment between the hub portions, the intermediate body portions 23 and 24 and shafts joined to hubs 13 and 14.

In order to carry out the objective of this invention of providing limited, controlled torsional deflection of the coupler in order to accommodate operational vibration and particularly start up and stopping torque loads, the two intermediate body portions 23 and 24 of the couplings midsection are interjoined by a plurality of flexible vane elements 30, 31, 32 and 33. Such vane elements are aligned longitudinally of body 11 and in opposing spaced parallelism radially outwardly of the longitudinal axis of the body. This relationship will be best recognized from FIGS. 1 and 5 of the drawings wherein the illustrated embodiment comprises four such vane elements which are of substantially rectangular cross sectional configuration of uniform thickness throughout the length thereof. It will be recognized from FIG. 5 in particular, that in the four vane embodiment illustrated, the vanes are disposed at 90° intervals about the circumference of body 11 and that the same are integrally joined at their opposite ends to the intermediate body portions 23 and 24. In practice the material between the desired number of vanes 30 is cut away as by sawing, milling or other machining operations. The thickness and length of the several vanes are selected in accordance with the torsional requirements to be transmitted or resisted while the limits of torsional or radial deflection resistance are determined not only by the yield strength and flexibility characteristics of the particular material from which the coupling assembly is made, but also by the number and dimensions of such vanes. For example, reference is made to FIG. 9 wherein twenty vanes 30a are provided for increased torsional resistance, as opposed to the four vanes structure of FIGS. 1, 5 and 6. It also is to be noted that the juncture between the ends of the vanes and the associated body portions 23 and 24 importantly comprises radiused intersections, as indicated at 34, for increased strength.

With specific reference now to FIGS. 6, 7 and 8 of the drawings, it will be noted that with opposingly related rotational or torque loads imposed on the hubs 13 and 14 as indicated by the directional arrows A and B in FIG. 6, the four illustrated vanes 30–33 flex transversely in accordance with the direction of the imposed torque loads. That is to say, the right hand ends of the vanes move with the torque load indicated by the directional arrows A while the left hand ends thereof move in accordance with the directional arrow B in FIG. 6. This activity is typical of start up torque for a motor driven shaft coupled to hub 13, for example, and a static load and shaft coupled to the hub 14. Under these circumstances it is many times desirable to provide limited torsional or radial deflection in the manner provided by the coupling assembly 10 of this invention to prevent coupling breakage and shock to the drive train.

It also will be noted that with such torque deflection of the coupling assembly as illustrated in FIG. 6, diametrically opposing vanes such as 31 and 33 as shown in FIG. 8, take on an intersecting alignment relationship diametrically on opposite sides of the coupling; it being understood, of course, that when the torque differential between the shafts connected to hubs 13 and 14 dissipates, the flexible nature of the vanes 30–33 is such that they return their normal diametrically, in line relationship as illustrated in FIG. 5.

As best shown in FIGS. 1 and 2 of the drawings, hubs 13 and 14 are provided with diametrically opposed set screws 40 available through external openings 41 therein whereby to connect the respective shafts (not shown) to hubs 13 and 14. In this regard it will be understood and appreciated within the skill of the art that attachment of the shafts to the hubs of the coupling may be carried out by other suitable known connective systems such as keys and keyways, taper locks or clamp type hubs, by way of example.

From the foregoing it is believed that those familiar with the art will readily understand and appreciate the novel concepts and advancements presented by the present invention and will recognize that while the same has herein been described in association with preferred and modified embodiments thereof illustrated in the accompanying drawings, the same is nevertheless susceptible to modification, change and substitution of equivalents without departing from the spirit and scope of the invention which is defined in the following appended claims.

The embodiments of the invention in which an exclusive property or privilege is claimed are defined as follows:

1. A unitary, mechanical, flexible coupling for interconnecting driving and driven shafts, comprising a cylindrical body having a cylindrical bore along its lengthwise axis, hub portions formed at opposite ends of said body having means for securing rotary shafts thereto, coaxially of said bore; a pair of axially spaced intermediate portions of said body located coaxially between and axially spaced from said hub portions, a selected plurality of axially spaced annular discs formed coaxially of and located between each said hub portion and an adjacent intermediate portion; said discs being aligned normal to said lengthwise axis of said body; adjacent discs being formed integrally with and interjoined by intervening pairs of circumferentially separated, spacers, with said hub and intermediate portions each being integrally formed with and joined to an axially adjacent said disc by a pair of said spacers; said discs being flexibly moveable about said spacers whereby said hub and intermediate portions are interconnected in a manner permitting angular, skewed and parallel misalignment and relative axial movement of shafts connected thereto; and a plurality of like elongated, flexible, circumferentially spaced vane elements formed integrally with and extending between opposing ends of said intermediate portions, said vane elements lying parallel to and radially outwardly of said lengthwise axis and operatively serving to flexibly and integrally interconnect said intermediate portions to accommodate limited relative rotational movement of the latter whereby to afford limited torsional deflection of said coupling.

2. The flexible coupling of claim 1, wherein said integral discs and spacers provide flexible zero backlash connectors between said hub and intermediate body portions with which they are integrally formed.

3. The flexible coupling of claim 1, wherein said spacers are aligned in diametrically opposed pairs on opposite sides of each of said discs; the diametrical alignment of said pairs associated with each disc being at right angles to one another.

4. The flexible coupling of claim 1, wherein said discs permit limited axial movement of said portions and shafts.

* * * * *

UNITED STATES PATENT AND TRADEMARK OFFICE
CERTIFICATE OF CORRECTION

PATENT NO. : 5,041,060
DATED : 8/20/91
INVENTOR(S) : Robert V. Hendershot

It is certified that error appears in the above-identified patent and that said Letters Patent is hereby corrected as shown below:

Col. 6, line 6, after "said" insert -- hub --.

Signed and Sealed this

Twenty-second Day of December, 1992

Attest:

DOUGLAS B. COMER

*Attesting Officer*      *Acting Commissioner of Patents and Trademarks*